UNITED STATES PATENT OFFICE.

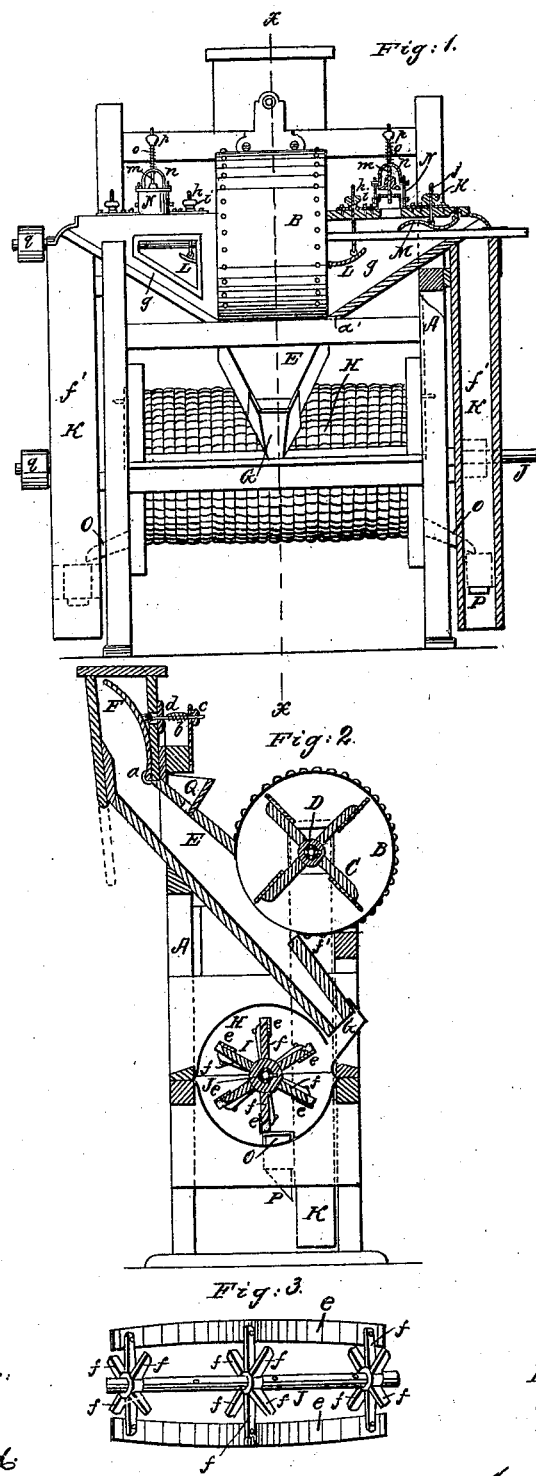

A. E. TEAL AND WILLIAM RANSOM, OF CICERO, INDIANA.

IMPROVEMENT IN SMUT AND GRAIN-CLEANING MACHINES.

Specification forming part of Letters Patent No. 36,311, dated August 26, 1862.

*To all whom it may concern:*

Be it known that we, A. E. TEAL and WILLIAM RANSOM, both of Cicero, in the county of Hamilton and State of Indiana, have invented a new and Improved Smut and Grain-Cleaning Machine; and we do hereby declare that the following is a full, clear, and exact description of the same, reference being had to the accompanying drawings, making a part of this specification, in which—

Figure 1 is a front elevation of our invention, partly in section. Fig. 2 is a vertical section of the same, taken in the line $xx$, Fig. 1; Fig. 3, a detached view of the beater of the same.

Similar letters of reference indicate corresponding parts in the several figures.

The object of this invention is to obtain a simple and efficient machine by which smut may be thoroughly broken and separated from the grain, and the latter deprived of all light impurities, and also separated from any chess which may be in it.

The invention consists in a novel arrangement of a scouring device, blast-fan, and blast-passages, as hereinafter fully shown and described, whereby the desired end is attained.

To enable those skilled in the art to fully understand and construct our invention, we will proceed to describe it.

A represents a framing, which may be constructed in any proper way to support the several parts comprising the machine, and B is a cylindrical fan-case, which is placed in the upper part of the framing A, and contains a fan, C, constructed in the usual way, but provided with a hollow or tubular shaft, D. The fan-case communicates at its lower part with an inclined spout, E, as shown clearly in Fig. 2. In the upper part of this spout E there is placed a valve, F, which is connected at its lower end to the inner side of the spout E by a hinge, $a$, and is adjusted by means of a screw, $b$, nut $c$, and spring $d$, as shown in Fig. 2. The lower end of the spout E communicates by a small spout, G, with the center of a cylindrical screen, H, which is placed horizontally in the frame A and constructed of wire in any proper way. This screen is provided with a beater, I, which is formed by having blades $e$ attached to the ends of arms $f$, which are secured radially to a hollow or tubular shaft, J. The blades $e$, however, are not parallel with the shaft J. They are made concave or hollowing at their face sides, in order to insure the grain being discharged from both ends of the screen H. (See Figs. 2 and 3, the latter figure showing the concave form by shading.)

K K represent two spouts which are attached one to each side of the framing A, and extend upward vertically from its lower end to its top, as shown at $f'$, and then extend horizontally to the fan-case B, as shown at $g$. The lower parts or bottoms of the parts $g$ of the spouts K are inclined downward toward the fan-case B, as shown in Fig. 1, and within each part $g$ where it communicates with the fan-case a valve, L, is placed, which is regulated by a screw-rod, $h$, and nut $i$. A valve, M, is also placed in each part $g$, which is regulated in a similar manner—to wit, by a screw-rod, $j$, and nut $k$. On the upper part of each part $g$ of the spouts K there is placed a small cylinder, N, in which a valve, $l$, is fitted. The valves $l$ of these cylinders have vertical rods $m$ attached to them, which pass up through guides $n$ on the cylinders and have spiral springs $o$ on them, the strength of which are regulated by nuts $p$. (See Fig. 1.)

At each end of the cylindrical screen H there is an inclined spout, O, which communicates with spouts P, leading into the lower parts of the spouts K K.

To the inclined spout F there is attached a hopper, Q, which communicates with spout E, as shown in Fig. 2.

The operation is as follows: The fan C and beater I are driven by belts which pass over pulleys $q$ at one end of their shafts, and the grain to be scoured and cleaned passes from the hopper Q into spout E, where it is subjected to a blast from the fan C, the valve F being so adjusted as to prevent the escape of any light grain (chess) from spout E. The grain is thus deprived of all loose and light impurities, and it falls into the spout G and thence into the cylindrical screen H, where it is subjected to a beating and scouring, and the smut-balls detached from it and broken under the action of beater I. The grain is discharged from both ends of the screen H into the lower parts of the spouts K and there is subjected to a suction-blast generated by the fan C, and the chess or light imperfect grain is drawn up the spouts K and is discharged through apertures $a'$ at the inner ends of the horizontal parts $g$ of spouts K, adjoining the fan-case B. The strength of the blast in the spouts K K is regulated by adjusting the nuts $p$, and thereby graduating the strength of the springs $o$ of the valves $l$. By adjusting the valves L M the suction-blast may also be still further regulated as occasion may require. The sound grain is discharged from the lower ends of the spouts K K, and the beater I, by its rotation, drives the smut and dust through the screen H, the blades $e$ generating a blast, the air entering through the hollow shaft J. Air also passes into the fan-case B through the tubular shaft D, in order that there may be a sufficient blast in spout E. These shafts J D are perforated laterally, in order to admit the air into the screen and fan-case. (See Fig. 3, in which the lateral perforations of the beater-shaft J are distinctly shown.)

Having thus described our invention, what we claim as new, and desire to secure by Letters Patent, is—

1. The valves $l$, placed within cylinders N on the spouts K and regulated by springs and nuts, as shown, or their equivalents, in connection with the valves L M and discharge-openings $a'$, for the purpose specified.

2. The tubular perforated shafts J D of the beater I and fan C, when said beater and fan are arranged in connection with the suction-spouts K K and blast-spout E, to operate as set forth.

A. E. TEAL.
WILLIAM RANSOM.

Witnesses:
E. WILLIAMSON,
W. A. PFAFF.